Figure 1:
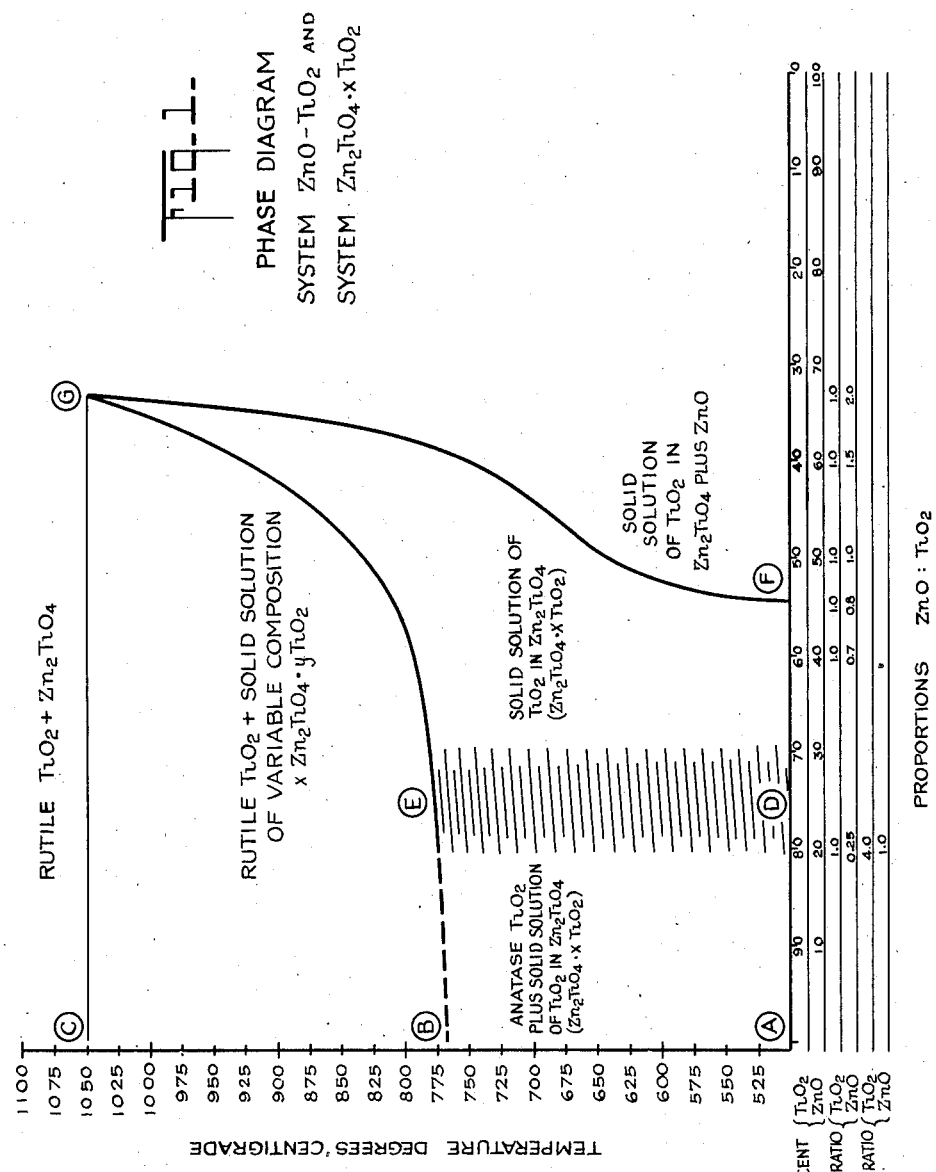

EFFECT OF TIME ON CATALYTIC CONVERSION OF ANATASE $TiO_2$ TO RUTILE $TiO_2$ IN PRESENCE OF $Zn_2TiO_4 \cdot TiO_2$ COMPOSITION OF STARTING MIXTURE
2% $Zn_2TiO_4 \cdot TiO_2$ (SOLID SOLUTION)

CONVERSION OF ANATASE $TiO_2$ TO RUTILE $TiO_2$

ANATASE CONTAINING
 A - NOTHING
 B - 0.5% ZnO
 C - 1.0% $Zn_2TiO_4 \cdot TiO_2$

HEATED 3 HOURS AT 900°C

INVENTORS
SANDFORD S. COLE,
WALTER K. NELSON
BY
ATTORNEY

Patented Apr. 28, 1942

2,280,795

UNITED STATES PATENT OFFICE 2,280,795

PREPARATION OF PIGMENTS COMPRISING RUTILE TITANIUM DIOXIDE

Sandford S. Cole and Walter K. Nelson, Metuchen, N. J., assignors to National Lead Company, New York, N. Y., a corporation of New Jersey Application August 7, 1937, Serial No. 157,888

11 Claims. (Cl. 106—292)

This invention relates to pigments comprising titanium dioxide having the crystalline structure of rutile and zinc orthotitanate and/or a solid solution of titanium dioxide in zinc orthotitanate. Throughout this description of our invention we have used the term "rutile titanium dioxide" as descriptive of titanium dioxide having the crystalline structure of rutile.

Titanium dioxide exists in three crystalline modifications: anatase, brookite, and rutile. Pigmentary titanium dioxide commercially available at the present time exists as the anatase modification. However, rutile possesses a higher index of refraction than anatase and therefore would be expected to possess a correspondingly greater tinctorial and hiding power. The conversion of anatase titanium dioxide to rutile titanium dioxide at elevated temperatures has been attempted but the resultant products are bad in color, aggregated, and hard, and are entirely unsuited for use as pigments. It is also known that the calcination of hydrous titanium oxide precipitated from halide solutions of titanium produces directly rutile titanium dioxide but to date the preparation of pigments from titanium halide solutions has not been commercially practised because of the excessive costs involved.

By means of our present invention it is possible to prepare pigments which comprise proportionately very large amounts of rutile titanium dioxide and very small amounts of zinc orthotitanate or, vice versa, very large amounts of zinc orthotitanate and very small amounts of rutile titanium dioxide.

Our invention is based upon the discovery that anatase titanium dioxide can be readily converted to rutile titanium dioxide when a mixture comprising anatase titanium dioxide and zinc orthotitanate, or a compound of zinc capable of combining with anatase titanium dioxide to form zinc orthotitanate, is heated at elevated temperatures as hereinafter set forth.

We have found that if anatase titanium dioxide is heated in the presence of zinc orthotitanate or if a solid solution of titanium dioxide ($TiO_2$) in zinc orthotitanate ($Zn_2TiO_4$), previously prepared or formed in situ, is similarly heated, a catalytic conversion of the anatase titanium dioxide into rutile titanium dioxide may be effected at temperatures lower than those which are required for the direct conversion of anatase to rutile and within shorter periods of time. The products so obtained are marketable rutile titanium dioxide pigments possessing a remarkable resistance to chalking when incorporated into surface coating compositions.

Our invention probably may best be explained in terms of a solid phase reaction, that is, a reaction occurring between solids in the absence of a liquid or gaseous phase. We have found that when a mixture of zinc orthotitanate and anatase titanium dioxide is heated a solid solution of the titanium dioxide in the zinc orthotitanate results. A whole series of solid solutions of titanium dioxide in zinc orthotitanate the composition of which will vary depending upon the respective proportions of each component of the original starting mixture may thus be obtained. We have further found that for a solid solution of any given composition of titanium dioxide and zinc orthotitanate there is a critical temperature above which the solid solution breaks down liberating rutile titanium dioxide and leaving a solid solution poorer in titanium dioxide than the original solid solution. If the temperature is raised sufficiently the solid solution completely dissociates into rutile titanium dioxide and zinc orthotitanate. The zinc orthotitanate is then free to take up in solid solution more anatase titanium dioxide which by passing through the solid solution phase is converted to rutile which is liberated in turn. The reactions taking place in the practice of our invention are thus apparently cyclical in nature and may be postulated by the following equations:

(I) 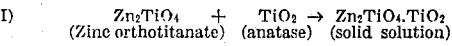
(Zinc orthotitanate)  (anatase)  (solid solution)

(II) 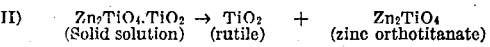
(Solid solution)  (rutile)  (zinc orthotitanate)

However, while the above is our interpretation of the process embodied in our invention, the exact mechanism is not known and we do not wish to be limited thereby.

Our invention and the range of composition of our novel pigments may be best understood from the phase diagram attached hereto as Figure No. 1. The shaded sector between the points D and E represents the interphase boundary between solid solutions of titanium dioxide in zinc orthotitanate (to the right of the shaded sector) and mixture of anatase titanium dioxide and solid solutions of titanium dioxide in zinc orthotitanate (to the left of the shaded sector). This boundary is represented by a shaded sector because the exact limit of solubility of titanium dioxide does not appear to be sharply defined but apparently lies within the range below $Zn_2TiO_4.7TiO_2$ (about 80% $TiO_2$:20% ZnO) and above $Zn_2TiO_4.1.5TiO_2$ (about 71.5% $TiO_2$ and 28.5% ZnO). If anatase titanium dioxide in excess of these proportions is present the composition will be found at temperatures above 500° C. in the area to the left of the shaded sector. On the other hand, if lesser amounts of titanium dioxide are present the compositions will be found at temperatures above 500° C. in the area to the right of the shaded sector bounded by the lines D—F, F—G, and E—G. With increasing temperature above the line B—E—G the solid solution decomposes liberating rutile titanium dioxide and a solid solution poorer in titanium dioxide having a composition as determined by the intersection of the ordinate of composition by the line E—G.

To illustrate, if at 500° C. the starting mixture contains 90 percent $TiO_2$ and 10 percent ZnO the composition will consist of a solid solution of titanium dioxide in zinc orthotitanate of the composition represented by the shaded sector and excess anatase titanium dioxide. Now, if the temperature be raised to 900° C. the solid solution will break down forming rutile titanium dioxide and a solid solution poorer in titanium dioxide of approximately the composition represented by the intersection of line E—G and the abscissa of temperature at 900° C.

At the temperature of 900° C. the solid solution will now take up the excess anatase titanium dioxide but, since at 900° C. all solid solutions containing more titanium dioxide than is represented by the intersection of the line E—G and the 900° C. temperature abscissa are unstable, a breakdown at once occurs with the liberation of more rutile titanium dioxide. This solid solution formation followed at once by a breakdown thereof continues until all the anatase titanium dioxide is converted to rutile and at 900° C. the final product consists of rutile and a solid solution of titanium dioxide in zinc orthotitanate of the composition stable at 900° C.

If the temperature then be raised above 1050° C. the solid solution of titanium dioxide in zinc orthotitanate which is stable at 900° C. will further breakdown liberating its titanium dioxide as rutile and leaving zinc orthotitanate, $Zn_2TiO_4$.

By suitable selection of the proportion of ZnO to $TiO_2$ in the starting mixtures, pigments may be prepared containing relatively small amounts of zinc orthotitanate or solid solutions of titanium dioxide in zinc orthotitanate with relatively large amounts of rutile titanium dioxide; or, on the other hand, pigments may be prepared containing relatively small amounts of rutile titanium dioxide to relatively large amounts either of zinc orthotitanate or of solid solutions of titanium dioxide in zinc orthotitanate. Thus, our novel pigments are not limited to any composition but include all compositions within the area above the line B—E—G on Fig. 1. Nor is the practice of our invention limited to heating at any specific temperature. In fact, the heating may be carried out at any temperature above the line B—E—G to obtain products of any desired composition. Generally, when dealing with starting mixtures of 20 percent or more ZnO with 80 percent or less $TiO_2$ the temperature should exceed about 775° C. in order that the solid solutions formed undergo some breakdown to liberate rutile titanium dioxide. When dealing with starting mixtures richer in titanium dioxide and poorer in zinc oxide it is only necessary to heat at about 775° C. to effect conversion to rutile of all the anatase titanium dioxide in excess of that which forms a stable solid solution with zinc orthotitanate at 775° C.

The course of solid solution formation may easily be followed in the known manner by means of the X-ray. From the diffraction patterns obtained from an X-ray analysis the size of the unit cell may be calculated. In general, the size of the unit cell increases as the composition approaches zinc orthotitanate, $Zn_2TiO_4$. Thus, we have found the unit cell size of $Zn_2TiO_4$ to be 8.46 Angstrom units. As more titanium dioxide is taken into solid solution this value decreases until the limit of the solid solution of titanium dioxide in zinc orthotitanate is reached.

Just as there is a wide latitude in the selection of temperature for the practice of our invention the composition of the starting mixtures may vary within wide limits, for example, the starting mixture may contain only a fraction of one percent, even as low as 0.25 percent of zinc oxide although for efficient conversion of anatase to rutile, should products be desired containing large amounts of rutile, it is preferable to start with mixtures containing about 1.0 percent zinc oxide. On the other hand, the starting mixture may contain only a very slight excess of titanium dioxide over the molecular ratio of 2 mols. ZnO to 1 mol. $TiO_2$. Thus, starting mixtures containing 34 percent $TiO_2$ and 66 percent ZnO yield products containing only small amounts of rutile titanium dioxide.

From the description of our invention thus far it will be seen that the objects of our invention include among others: (1) the conversion of anatase titanium dioxide to rutile titanium dioxide of desirable pigment properties; (2) the preparation of composite pigments comprising rutile titanium dioxide and zinc orthotitanate or rutile titanium dioxide and a solid solution of titanium dioxide in zinc orthotitanate.

In carrying out the process of our invention certain conditions must be adhered to in order to achieve the desired result. Thus, for instance, the preparation of the starting mixture must be carried out so as to obtain an intimate mixture of finely-divided titanium compound and zinc compound because, as will be appreciated, speed of reaction in the solid state and uniformity of the products resulting therefrom depend, in a large measure, upon the close contact of the reactants. We have found, for example, that one method by means of which the desired intimately mixed starting mixture may be prepared is by milling aqueous slurries of the zinc compound, e. g., ZnO, together with the titanium compound, then drying the resulting mixture.

We have also found that the mixture, prior to conversion, must consist either of a mixture of anatase titanium dioxide and a solid solution of titanium dioxide in zinc orthotitanate or simply a solid solution of titanium dioxide in zinc orthotitanate. This may be accomplished in several ways.

For instance, zinc orthotitanate may be formed by thermal combination of a titanium-oxygen compound and zinc oxide which takes place at about 430° C. The zinc orthotitanate may then be heated below about 775° C. in admixture with additional titanium oxygen compound to form a solid solution of titanium dioxide in zinc orthotitanate. In accord with one feature of our invention this solid solution may then be heated above its stability point to form a pigment consisting of rutile titanium dioxide and a solid solution poorer in titanium dioxide or consisting simply of rutile titanium dioxide and zinc orthotitanate. Or, on the other hand, when the solid solution has been formed the reaction mixture may be allowed to cool and a small portion thereof may be mixed in a suitable manner with anatase titanium dioxide and this mixture then heated as set forth above until the anatase is converted into rutile titanium dioxide. In this method of practicing our invention a solid solution corresponding to $Zn_2TiO_4 \cdot TiO_2$, i. e., 1 mol. ZnO to 1 mol. $TiO_2$, is very efficient in effecting the conversion. For example, in a mixture consisting of 2 percent $Zn_2TiO_4 \cdot TiO_2$ and 98 percent anatase $TiO_2$ the latter is substantially completely converted to rutile by heating for only about three hours at about 875° C.

In another method, anatase titanium dioxide or a suitable titanium oxygen compound, such as hydrous titanium oxide hydrolytically precipitated from titanium sulfate solutions which will form anatase titanium dioxide when heat-treated, may be heated directly with zinc oxide or a compound of zinc capable of combining with the titanium compound at the elevated temperatures employed to form zinc orthotitanate. If this method of practicing our invention be followed the starting mixture of zinc and titanium-oxygen compounds are carefully heated at above about 430° C. (the initial temperature at which combination between ZnO and $TiO_2$ occurs). It is preferable, in order to preserve superior pigment properties to maintain the heating below about 775° C. until all the zinc has been combined as zinc orthotitanate and this in turn has formed a solid solution with the excess titanium-oxygen compound before elevating the temperature above the stability point of the solid solution.

Figure 2:
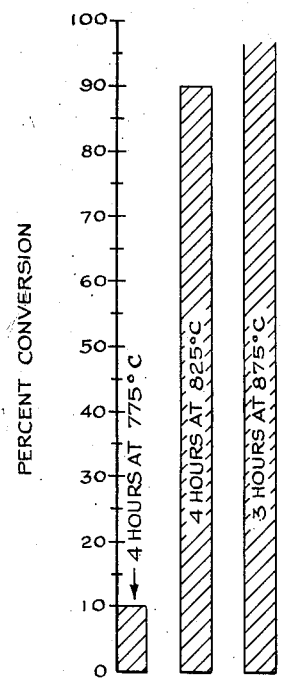
Figure 3:
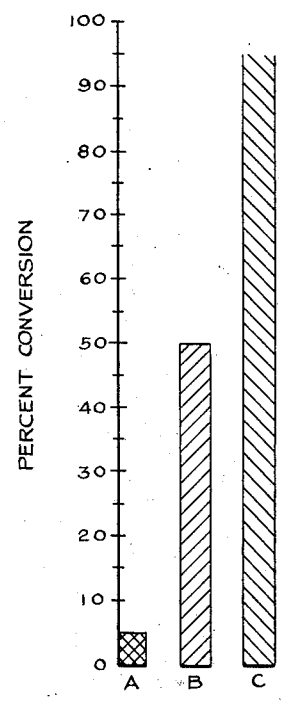

A comparison of the relative efficiency of two methods of practicing our invention is shown in Figure 3. On this figure the column A shows that only about 5 percent of anatase was converted to rutile by heating in the ordinary way for three hours at 900° C. If, in accordance with one of our methods, only 1.0 percent of a previously prepared solid solution of titanium dioxide in zinc orthotitanate be added to anatase titanium dioxide the conversion is substantially complete after heating for the same time at the same temperature (column C). When, in accordance with another method only zinc oxide is added to form, in situ, the solid solution the conversion to rutile is only about 50 percent in three hours heating at 900° C. As will be appreciated, the rate of breakdown of solid solution and consequently the rate of conversion of the anatase to rutile depends to a certain extent upon the time of heating as well as on the temperature above the stability point of the solid solution. The effect of time on rate of conversion of anatase to rutile is shown in Figure 2. It will be seen that at 775° C. which is about the lowest point at which the solid solution $Zn_2TiO_4 \cdot TiO_2$ begins to decompose only 10 percent of the anatase is converted to rutile after four hours of heating, whereas 90 percent is converted at 825° C. after four hours of heating and over 95 percent at 875° C. after three hours of heating. Therefore, in commercial adaptation of our invention it will be desirable to operate in such a manner as to obtain the most rapid conversion of the anatase to rutile without adversely affecting the pigment properties of the products.

In the claims attached hereto we have used the term "reactive zinc compound" by which we mean to include: (a) zinc oxide, (b) a compound of zinc which at elevated temperatures will combine with titanium oxide to form zinc orthotitanate, (c) zinc orthotitanate, and (d) solid solutions of titanium dioxide in zinc orthotitanate. We have also used the term "anatase titanium-oxygen compound" by which we mean not only anatase titanium dioxide but hydrous titanium oxide hydrolytically precipitated from titanium sulfate solution which, when heat-treated, yields anatase titanium dioxide.

In a copending application Serial No. 157,887, filed August 7, 1937, by one of us it is shown that solid solutions of titanium dioxide in zinc orthotitanate may be stabilized against dissociation by the presence of certain compounds, e. g., phosphates. It is obvious therefore that the titanium-oxygen compound used in practising this present invention must be free from such stabilizing agents.

As illustrations of our invention the following examples are given:

EXAMPLE 1.—*Preparation of a pigment containing relatively large amounts of rutile titanium dioxide*

A solid solution of the composition, $$Zn_2TiO_4 \cdot TiO_2$$

is first prepared as follows:

A water slurry of 80 lbs. of finely-divided zinc oxide is milled with purified hydrous titanium oxide containing 80 lbs. titanium dioxide for about two hours. The resulting uniform and intimate mixture of starting materials is dried at about 110° C. and then heated at about 700° C. for about five hours. The resulting product is a solid solution of 1 mol. $TiO_2$ in 1 mol. $Zn_2TiO_4$.

Two pounds of the solid solution obtained as just above described is then intimately mixed, as by milling in a pebble-mill, with hydrous titanium oxide containing 100 lbs. titanium dioxide. The resulting mixture is dried and then heated at about 875° C. for about three hours. A product consisting of approximately 98 percent rutile titanium dioxide and 2 percent of a solid solution of the composition $Zn_2TiO_4 \cdot 0.6TiO_2$ is thus obtained. When this product is pulverized in the known manner, a superior white pigment useful in many industrial arts is obtained.

EXAMPLE 2.—*Preparation of a pigment by heating a solid solution of titanium dioxide in zinc orthotitanate above the stability point*

One hundred pounds of the solid solution of the composition $Zn_2TiO_4 \cdot TiO_2$ obtained as described under Example 1 is heated for about three hours at about 950° C.

As a result of this heat treatment the solid solution breaks down liberating rutile titanium dioxide and a solid solution of titanium dioxide in zinc orthotitanate stable at above 950° C., having the approximate composition, $$Zn_2TiO_4 \cdot 0.25TiO_2$$

The product thus consists of about 25 lbs. of rutile titanium dioxide and 75 lbs. of a solid solution of the composition $Zn_2TiO_4 \cdot 0.25TiO_2$. When pulverized the product is an excellent pigment suitable particularly for the preparation of protective surface coating compositions.

EXAMPLE 3.—*Preparation of a pigment by direct heating of zinc oxide and titanium dioxide*

A uniform and intimate mixture of 108 lbs. of finely-divided zinc oxide and 80 lbs. of previously prepared anatase titanium dioxide is heated between about 850° C. and 900° C. for about three hours to form a solid solution having the approximate composition $Zn_2TiO_4 \cdot 0.25TiO_2$. The temperature is then raised to about 1000° C. and maintained at that point for an additional three hours. The product thus obtained consists of a mixture of rutile and a solid solution of the approximate composition $Zn_2TiO_4 \cdot 0.17TiO_2$. When pulverized this product is excellently adapted for use as a pigment.

Pigments prepared according to our invention are extremely useful for many purposes. Those containing relatively large amounts of rutile titanium dioxide may be employed with superior results in place of the anatase titanium dioxide commercially produced at present. As the content of zinc orthotitanate or of solid solution of titanium dioxide in zinc orthotitanate is increased, the products become better suited for use in protective coatings on metal surfaces and the like. One of the advantages of our invention is that products of any desired predetermined composition may be prepared in accordance with the use to which they are to be put.

Useful products may also be obtained according to our invention, by blending together products of different composition prepared as described herein.

In the claims appended hereto we have defined rutile titanium dioxide contained in our novel pigments "as a thermally produced decomposition product of a solid solution of titanium dioxide in zinc orthotitanate" meaning thereby that the rutile titanium dioxide results from the heating of titanium dioxide in the presence of zinc orthotitanate. We have designated those constituents of our novel pigments which contain both titanium and zinc as "thermally-produced combinations of zinc oxide and titanium dioxide" meaning to include zinc orthotitanate as well as solid solutions of titanium dioxide in zinc orthotitanate.

This description of our invention has been given for clearness of understanding and no undue limitations are to be deduced therefrom but the appended claims should be construed as broadly as possible in the light of the prior art.

We claim:

1. Method for the preparation of a pigmentary composition comprising rutile titanium dioxide and a thermally produced combination of zinc oxide and titanium dioxide, which comprises heating between about 430° C. and about 775° C. a mixture of a reactive zinc compound and anatase titanium-oxygen compounds in which the ZnO-content is not less than between 20.0 percent and 28.5 percent of the total weight of ZnO and $TiO_2$, until a solid solution of titanium dioxide in zinc orthotitanate is formed, mixing the so-produced solid solution with further amounts of anatase titanium-oxygen compounds and heating the resulting mixture above temperatures which can be represented on a graph where the abscissae are temperatures in degrees centigrade from 750° C. at the bottom to 1075° C. at the top and the ordinates are percent compositions varying in regular, proportional integers from 100 percent $TiO_2$ and zero percent ZnO at the left to zero percent $TiO_2$ and 100 percent ZnO at the right, by a curve drawn through the following points of intersection:

| Abscissae | Ordinates |
| --- | --- |
| °C. | |
| 770 | 99% $TiO_2$:1.0% ZnO |
| 772 | 90% $TiO_2$:10% ZnO |
| 775 | 80% $TiO_2$:20% ZnO |
| 780 | 70% $TiO_2$:30% ZnO |
| 792 | 60% $TiO_2$:40% ZnO |
| 827 | 50% $TiO_2$:50% ZnO |
| 925 | 40% $TiO_2$:60% ZnO |
| 1050 | 33.3% $TiO_2$:66.7% ZnO | until a conversion of anatase titanium-oxygen compounds to rutile titanium dioxide is discernible by means of an X-ray examination.

2. Method for the preparation of a pigmentary composition comprising rutile titanium dioxide and a thermally produced combination of zinc oxide and titanium dioxide, which comprises heating a mixture of a reactive zinc compound and anatase titanium-oxygen compounds at temperatures between above 430° C. and about 775° C., until a solid solution of titanium dioxide in zinc orthotitanate is formed, mixing the so-produced solid solution with further amounts of anatase titanium-oxygen compounds and heating the resulting mixture above temperatures which can be represented on a graph where the abscissae are temperatures in degrees centigrade from 750° C. at the bottom to 1075° C. at the top and the ordinates are percent compositions varying in regular, proportional integers from 100 percent $TiO_2$ and zero percent ZnO at the left to zero percent $TiO_2$ and 100 percent ZnO at the right, by a curve drawn through the following points of intersection:

| Abscissae | Ordinates |
| --- | --- |
| °C. | |
| 770 | 99% $TiO_2$:1.0% ZnO |
| 772 | 90% $TiO_2$:10% ZnO |
| 775 | 80% $TiO_2$:20% ZnO |
| 780 | 70% $TiO_2$:30% ZnO |
| 792 | 60% $TiO_2$:40% ZnO |
| 827 | 50% $TiO_2$:50% ZnO |
| 925 | 40% $TiO_2$:60% ZnO |
| 1050 | 33.3% $TiO_2$:66.7% ZnO | until a conversion of anatase titanium-oxygen compounds to rutile titanium dioxide is discernible by means of an X-ray examination.

3. Method for the preparation of a pigmentary composition comprising rutile titanium dioxide and a thermally produced combination of zinc oxide and titanium dioxide, which comprises heating between about 430° C. and about 775° C. a mixture of a reactive zinc compound and anatase titanium-oxygen compounds in proportions of about 1 mol. $TiO_2$ to 1 mol. ZnO, until a solid solution of titanium dioxide in zinc orthotitanate of approximately the composition $Zn_2TiO_4 \cdot TiO_2$ is formed, mixing the so-produced solid solution with further amounts of anatase titanium-oxygen compounds and heating the resulting mixture at temperatures between above about 775° C. and 1100° C., thereby to convert anatase titanium-oxygen compounds to rutile titanium dioxide.

4. Method for the preparation of a pigmentary composition comprising rutile titanium dioxide and a thermally produced combination of zinc oxide and titanium dioxide, which comprises heating a mixture of previously prepared solid solution of titanium dioxide and anatase titanium-oxygen compounds above temperatures which can be represented on a graph where the abscissae are temperatures in degrees centigrade from 750° C. at the bottom to 1075° C. at the top and the ordinates are percent compositions varying in regular, proportional integers from 100 percent $TiO_2$ and zero percent ZnO at the left to zero percent $TiO_2$ and 100 percent ZnO at the right, by a curve drawn through the following points of intersection:

| Abscissae | Ordinates |
| --- | --- |
| °C. | |
| 770 | 99% $TiO_2$:1.0% ZnO |
| 772 | 90% $TiO_2$:10% ZnO |
| 775 | 80% $TiO_2$:20% ZnO |
| 780 | 70% $TiO_2$:30% ZnO |
| 792 | 60% $TiO_2$:40% ZnO |
| 827 | 50% $TiO_2$:50% ZnO |
| 925 | 40% $TiO_2$:60% ZnO |
| 1,050 | 33.3% $TiO_2$:66.7% ZnO | until a conversion of anatase titanium-oxygen compounds to rutile titanium dioxide is discernible by means of an X-ray examination.

5. Method for the preparation of a pigmentary composition comprising rutile titanium dioxide and a thermally produced combination of zinc oxide and titanium dioxide, which comprises heating a solid solution of titanium dioxide in zinc orthotitanate above temperatures which can be represented on a graph where the abscissae are temperatures in degrees centigrade from 750° C. at the bottom to 1075° C. at the top and the ordinates are percent compositions varying in regular, proportional integers from 100 percent TiO₂ and zero percent ZnO at the left to zero percent TiO₂ and 100 percent ZnO at the right, by a curve drawn through the following points of intersection:

| Abscissae | Ordinates |
| --- | --- |
| °C. | |
| 770 | 99% TiO₂:1.0% ZnO |
| 772 | 90% TiO₂:10% ZnO |
| 775 | 80% TiO₂:20% ZnO |
| 780 | 70% TiO₂:30% ZnO |
| 792 | 60% TiO₂:40% ZnO |
| 827 | 50% TiO₂:50% ZnO |
| 925 | 40% TiO₂:60% ZnO |
| 1,050 | 33.3% TiO₂:66.7% ZnO | until a conversion of anatase titanium-oxygen compounds to rutile titanium dioxide is discernible by means of an X-ray examination.

6. Method for the preparation of a pigmentary composition comprising rutile titanium dioxide and a thermally produced combination of zinc oxide and titanium dioxide, which comprises heating a solid solution of titanium dioxide in zinc orthotitanate at temperatures between above about 775° C. and 1100° C.

7. Method for the preparation of a pigmentary composition comprising rutile titanium dioxide and a thermally produced combination of zinc oxide and titanium dioxide, which comprises intimately and uniformly mixing a reactive zinc compound with anatase titanium-oxygen compounds in such proportions that the ZnO-content is between from about 0.5 percent to less than 67.0 percent of the combined weight of TiO₂ and ZnO contained in the mixture, and heating the said mixture first at temperatures between about 430° C. and about 775° C. to combine the ZnO with the TiO₂ and until a solid solution of titanium dioxide in zinc orthotitanate is formed, then intensifying the heating above temperatures which can be represented on a graph where the abscissae are temperatures in degrees centigrade from 750° C. at the bottom to 1075° C. at the top and the ordinates are percent compositions varying in regular, proportional integers from 100 percent TiO₂ and zero percent ZnO at the left to zero percent TiO₂ and 100 percent ZnO at the right, by a curve drawn through the following points of intersection:

| Abscissae | Ordinates |
| --- | --- |
| °C. | |
| 770 | 99% TiO₂:1.0% ZnO |
| 772 | 90% TiO₂:10% ZnO |
| 775 | 80% TiO₂:20% ZnO |
| 780 | 70% TiO₂:30% ZnO |
| 792 | 60% TiO₂:40% ZnO |
| 827 | 50% TiO₂:50% ZnO |
| 925 | 40% TiO₂:60% ZnO |
| 1,050 | 33.3% TiO₂:66.7% ZnO | until a conversion of anatase titanium-oxygen compounds to rutile titanium dioxide is discernible by means of an X-ray examination.

8. Method for the preparation of a pigmentary composition comprising rutile titanium dioxide and a thermally produced combination of zinc oxide and titanium oxide, which comprises intimately and uniformly mixing zinc oxide with anatase titanium-oxygen compounds in such proportions that the ZnO-content is between from about 0.5 percent to less than 67.0 percent of the combined weight of TiO₂ and ZnO contained in the mixture and heating the said mixture at temperatures between about 430° C. and about 775° C., until a solid solution of titanium dioxide in zinc orthotitanate is formed, then intensifying the heating to temperatures above about 775° C. to 1100° C., until a conversion of anatase titanium-oxygen compounds to rutile titanium dioxide is discernible by means of an X-ray examination.

9. A process for preparing white pigments comprising heating a mixture of anatase titanium-oxygen compounds and a zinc titanate in such proportions that the mol ratio of zinc calculated as ZnO to titanium calculated as TiO₂ is less than 2:1 at a temperature between above 840° C. and 1100° C., until by X-ray examination the presence of a substantial amount of rutile titanium dioxide can be detected.

10. A process for preparing white pigments comprising heating a mixture of anatase titanium-oxygen compounds and zinc orthotitanate in such proportions that the mol ratio of zinc calculated as ZnO to titanium calculated as TiO₂ is less than 2:1 at a temperature between above 840° C. and 1100° C., until by X-ray examination the presence of a substantial amount of rutile titanium dioxide can be detected.

11. A process for producing an improved pigment which comprises calcining precipitated, hydrous anatase titanium oxide in the presence of a small amount of zinc oxide at a temperature between above 840° C. and 1100° C., and continuing said calcination until substantial conversion of said anatase to rutile becomes effected and can be detected by X-ray examination.

SANDFORD S. COLE.
WALTER K. NELSON.